July 19, 1927.
J. E. GERNELLE-DANLOY
1,636,360
GRINDING, CRUSHING, AND MIXING MACHINE OR MILL
Filed Aug. 14, 1924
2 Sheets-Sheet 1
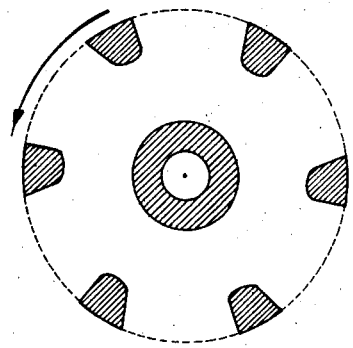
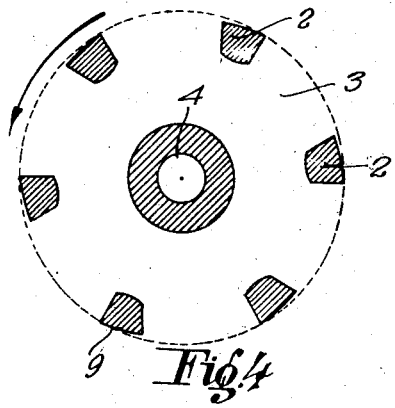
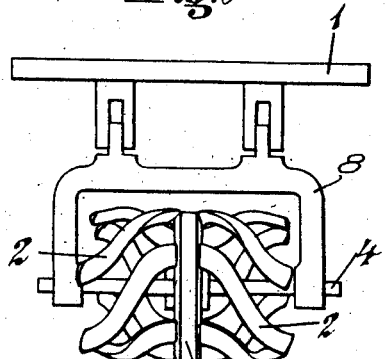
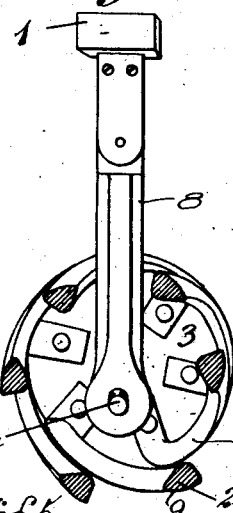
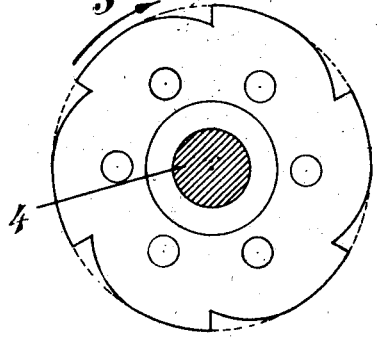
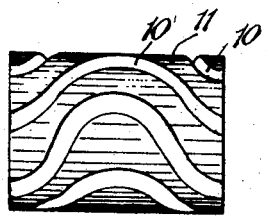
Inventor.
J.E.G. Danloy,
by
atty.

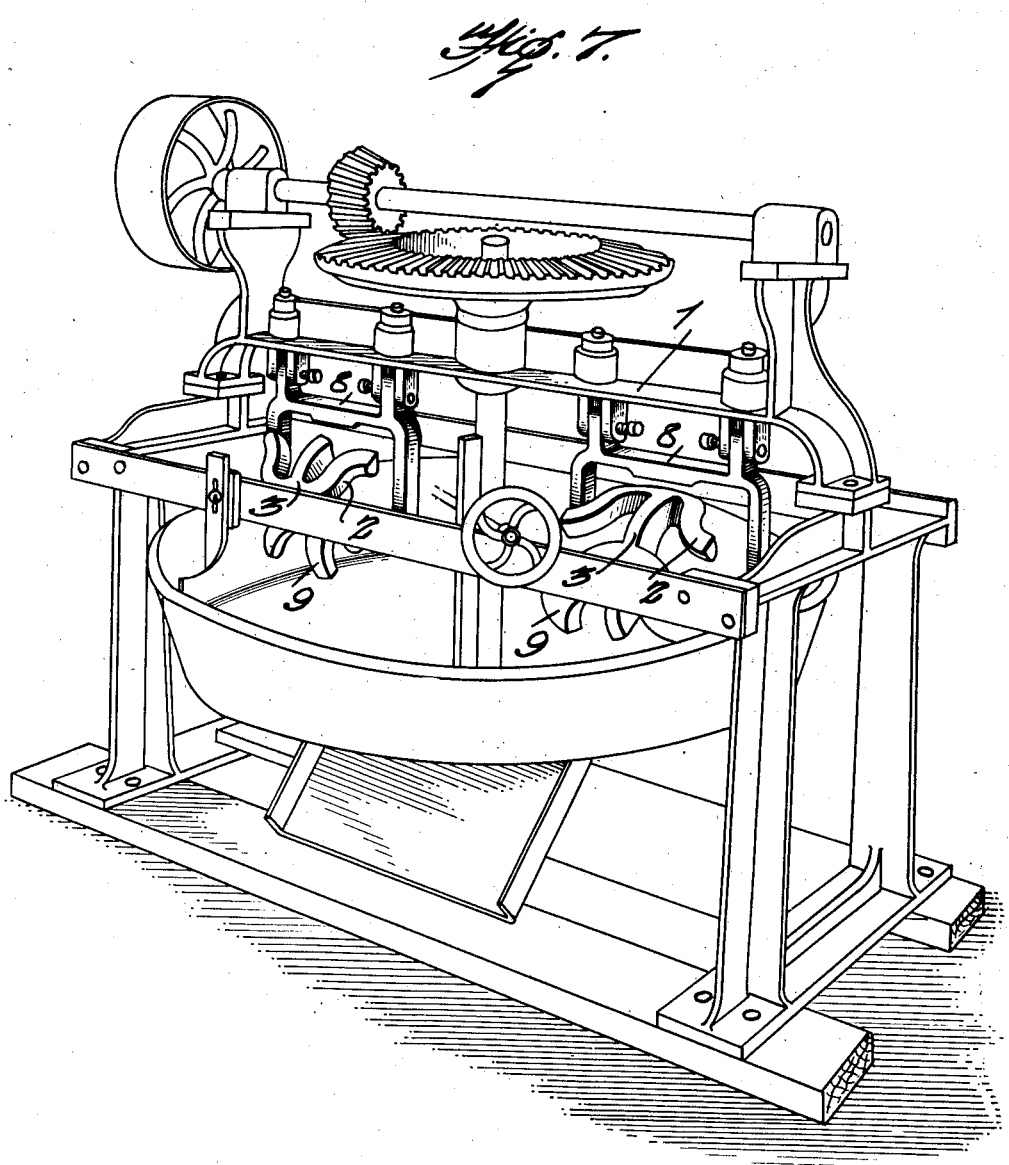

Patented July 19, 1927.

1,636,360

UNITED STATES PATENT OFFICE.

JOSEPH EMILE GERNELLE-DANLOY, OF ROUEN, FRANCE.

GRINDING, CRUSHING, AND MIXING MACHINE OR MILL.

Application filed August 14, 1924, Serial No. 732,096, and in France September 1, 1923.

This invention is directed to an improvement in grinding mills designed particularly for handling more or less fine material and involving a rotating grinding member having an outer or peripheral surface or edge for grinding purposes.

Whereas heretofore grinding mills of this character have been provided with twisted-arm grinding members, the peripheral or grinding edge of which was concentric to the axis, the grinding function has been unsatisfactory particularly in the handling of fluid moist or viscous materials, due to the fact that the material was continually slipping away from the grinding surface, and hence but little real grinding action was had. The present invention is directed to modifying the grinding surface so that in each instance, the surface presents an angular relation to the cooperating grinding surface so that the material is continually compressed and thus held for effective grinding.

The invention is illustrated in the accompanying drawings, in which:

Fig. 1 is an enlarged sectional view through the usual type of rotating element involving twisted arms.

Fig. 2 is a similar view showing the modified arrangement of the grinding surface according to the present invention.

Fig. 3 is a view in elevation.

Fig. 4 is a view in section of the improved grinding element.

Fig. 5 is a view in elevation of a modified grinding element.

Fig. 6 is a view illustrating diagrammatically the action of the grinding element.

Fig. 7 is a view illustrating the application of the improvement to a working apparatus.

In Figs. 3 and 4, the grinding element, which it is understood cooperates with a rotating or revolving vat or pan in which the material is placed, includes a frame 1, from which is supported a hanger 8 rotatably supporting a shaft 4 forming the axis for a central carrier 3, from which radiate the twisted grinding arms 2. As will be clear from Figs. 2 and 4, the outer or grinding surfaces 9 of these arms are so arranged as to operate at an angle to the cooperating grinding surface. That is to say, the advanced edge of the grinding surface of each arm is on a less radius than the remote or final edge, whereby the grinding surface in its action on the material tends to exert a continually increasing pressure thereon as the arms are rotated, thereby holding the material in position to be effectively acted on in the grinding operation.

In Fig. 5, there is shown a slightly modified form, in which the revolving grinding element is in the form of a cylinder with sinuous channels 10 therein providing intervening grinding sections 11, which it will be seen from the diagrammatic illustration in Fig. 6 is substantially the same as that described in connection with the grinding surface of the arms of the preferred form. In this form, the grinding element grasps the material under treatment and causes it to follow the channels, which decrease in both directions from the center of the grinding element to the ends, so that in this movement of the material, there is a continual compression on the material which prevents it from slipping away from the grinding surface.

What I claim is:

1. A rotary element of a grinding machine made up of a series of arms disposed in the same circumferential plane and curving in the axial direction, said arms having grinding surfaces operating to increasingly compress the material on the cooperating grinding surfaces in the direction of grinding.

2. A rotary element of a grinding machine made up of a series of arms disposed in the same circumferential plane and curving in the axial direction, said arms having grinding surfaces with the initial edge spaced farther from the cooperating grinding element than the final edge.

3. A rotary element of a grinding machine, comprising a central disc mounted for rotary movement, and a plurality of arms extending axially therefrom in substantially the same circumferential plane and each curved in the axial direction so that the free end of one arm is in the axial plane of the disconnected end of the adjacent arm, the grinding surfaces of said arms being formed to gradually and increasingly compress the material on the cooperating grinding surface in the direction of grinding.

4. A rotary grinding element of a grinding machine, including a series of arms disposed in the same circumferential plane and curving in the axial direction, each arm having a grinding surface for cooperation with a grinding surface common to all the arms, the arm-grinding surface being inclined away from the common grinding surface in the direction of grinding.

5. A rotary grinding element of a grinding machine, including a series of arms disposed in the same circumferential plane and curving in the axial direction, each arm having a grinding surface for cooperation with a grinding surface common to all the arms, a cooperating grinding surface common to all arms, the leading edge of each arm-grinding surface being spaced farther than the trailing edge from the cooperating grinding surface.

Signed at Paris, France, this 8th day of July A. D. 1924.

JOSEPH EMILE CERNELLE-DANLOY.